US011706303B2

(12) United States Patent
Janardanan et al.

(10) Patent No.: US 11,706,303 B2
(45) Date of Patent: Jul. 18, 2023

(54) SURVIVABILITY METHOD FOR LISP BASED CONNECTIVITY

(71) Applicant: Cisco Technology, Inc., San Jose, CA (US)

(72) Inventors: Raja Janardanan, Milpitas, CA (US); Sanjay Kumar Hooda, Pleasanton, CA (US); Victor Manuel Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/237,885

(22) Filed: Apr. 22, 2021

(65) Prior Publication Data

US 2022/0345531 A1 Oct. 27, 2022

(51) Int. Cl.
| | |
|---|---|
| *G06F 15/173* | (2006.01) |
| *H04L 67/146* | (2022.01) |
| *H04L 43/0811* | (2022.01) |
| *H04L 45/745* | (2022.01) |
| *H04L 49/10* | (2022.01) |
| *H04L 49/201* | (2022.01) |
| *H04L 67/147* | (2022.01) |

(52) U.S. Cl.
CPC ........ *H04L 67/146* (2013.01); *H04L 43/0811* (2013.01); *H04L 45/745* (2013.01); *H04L 49/10* (2013.01); *H04L 49/201* (2013.01); *H04L 67/147* (2013.01)

(58) Field of Classification Search
CPC . H04L 67/146; H04L 43/0811; H04L 45/745; H04L 49/10; H04L 49/201; H04L 67/147

USPC ......... 709/224, 202; 714/4.1; 370/218, 389, 370/351; 713/2
See application file for complete search history.

(56) References Cited

U.S. PATENT DOCUMENTS

| | | | |
|---|---|---|---|
| 9,191,318 B1 * | 11/2015 | Van de Velde | ..... H04L 61/2592 |
| 2004/0139167 A1 * | 7/2004 | Edsall | ................. H04L 67/1097 709/212 |
| 2004/0221149 A1 * | 11/2004 | Rao | ......................... H04L 67/10 713/2 |

(Continued)

FOREIGN PATENT DOCUMENTS

WO 2020084335 4/2020

*Primary Examiner* — Thuong Nguyen
(74) *Attorney, Agent, or Firm* — Polsinelli (57) ABSTRACT

The present disclosure provides systems, methods and computer-readable media for maintaining network connectivity, in a LISP based network, when one or more network edge nodes lose connectivity to a LISP control plane of the network, using multicast messaging. In one example, a method includes receiving a connection request from a first endpoint to a second endpoint communicatively coupled to a second edge node; determining, by the first edge node, that a connection session to a control plane for locating the second endpoint has failed; querying one or more available edge nodes for locating the second endpoint using a multicast message; locating the second endpoint based on at least one query response received from the one or more available edge nodes, at least one query response including an identifier of the second endpoint; and establishing the connection request between the first endpoint and the second endpoint upon locating the second endpoint.

20 Claims, 5 Drawing Sheets

(56) References Cited

U.S. PATENT DOCUMENTS

| | | | |
|---|---|---|---|
| 2005/0135330 A1* | 6/2005 | Smith | H04L 47/70 370/351 |
| 2011/0090785 A1* | 4/2011 | Shimizu | H04L 45/22 370/389 |
| 2014/0208152 A1* | 7/2014 | Magoshi | H04L 69/163 714/4.1 |
| 2014/0241351 A1* | 8/2014 | Kollipara | H04L 45/507 370/390 |
| 2015/0271052 A1* | 9/2015 | Chunduri | H04L 45/18 370/400 |
| 2016/0352617 A1 | 12/2016 | Wang et al. | |
| 2017/0013547 A1* | 1/2017 | Skaaksrud | H04W 24/08 |
| 2017/0105155 A1* | 4/2017 | Zhao | H04L 45/28 |
| 2017/0316106 A1 | 11/2017 | Pillay-Esnault | |
| 2017/0339623 A1* | 11/2017 | Pillay-Esnault | H04W 40/20 |
| 2018/0069751 A1* | 3/2018 | Guo | G06F 16/137 |
| 2018/0139133 A1* | 5/2018 | Makhijani | H04L 61/106 |
| 2019/0020489 A1 | 1/2019 | Moreno et al. | |
| 2020/0036575 A1* | 1/2020 | Palavalli | G06F 11/2046 |
| 2020/0245206 A1 | 7/2020 | Allan | |
| 2020/0344146 A1* | 10/2020 | Roberts | H04L 45/02 |
| 2021/0208860 A1* | 7/2021 | Freeman | G06F 21/64 |
| 2021/0218794 A1* | 7/2021 | Jain | H04L 41/0823 |

\* cited by examiner

SURVIVABILITY METHOD FOR LISP BASED CONNECTIVITY

TECHNICAL FIELD

The subject matter of this disclosure relates in general to the field of network communications and more specifically to systems and methods for preserving LISP (Locator Identification Separation Protocol) based connectivity between a centralized LISP control plane and one or more nodes within the network.

BACKGROUND

An enterprise network may implement a Locator Identification Separation Protocol (LISP) architecture and protocol that utilizes name spaces instead of IP addresses. As part of this architecture, a LISP control plane provides a distributed mapping system for mapping Endpoint Identifiers (EIDs) that are assigned to end hosts, such as routers, edge nodes, etc. When a first device attempts to communicate with a second device within the network, the first device can send a connection request through a first edge node to the LISP control plane. The LISP control plane can respond to the connection request with location information of the second device through a second edge node, thus allowing for a connection session to be established between the first device and the second device.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Example embodiments described herein provide systems, methods and computer-readable media for survivability and maintaining of LISP based connections, in a LISP based network, when one or more nodes, within the same geographical area/building or otherwise, lose connectivity to the LISP control plane. This loss of connectivity may prevent network edge nodes from retrieving EID locations by establishing a connection to the LISP control plane. In some example embodiments and as will be described below, a multicast messaging scheme may be utilized for identifying EID locations of a destination node from one or more edge nodes in the absence of connectivity to the LISP control plane.

In one example, a method can include receiving, by a first edge node, a connection request from a first endpoint to a second endpoint, the first endpoint being communicatively coupled to the first edge node and the second endpoint being communicatively coupled to a second edge node; determining, by the first edge node, that a connection session to a control plane for locating the second endpoint has failed;

querying one or more available edge nodes for locating the second endpoint using a multicast message; locating the second endpoint based on at least one query response received from the one or more available edge nodes, at least one query response including an identifier of the second endpoint; and establishing the connection request between the first endpoint and the second endpoint upon locating the second endpoint.

In another example, the connection session to the control plane may be a Locator Identification Separation Protocol (LISP) session to locate the second endpoint.

In another example, each available edge node may maintain connectivity states of endpoints connected thereto and responds with a map-request message to the query.

In another example, the method may further include determining that the identifier of the second endpoint does not exist in a local cache of the first edge node, wherein the first edge node queries the one or more available edge nodes upon determining that the identifier of the second endpoint does not exist in the local cache of the first edge node.

In another example, the one or more available edge nodes may be located within a same physical location as the first edge node.

In another example, the multicast message may be sent to a multicast group address with which all edge nodes are configured by a controller of an enterprise network in which the first edge node, the second edge node, the first endpoint and the second endpoint operate.

In another example, the one or more edge nodes may be network fabric edge nodes or default network border nodes.

In one example, a system includes a first edge node and a second edge node. The first edge node may have one or more processors and one or more memories having stored therein computer-readable instructions which, when executed by the one or more processors, cause the one or more processors to receive, at the first edge node, a connection request from a first endpoint to a second endpoint, the first endpoint being communicatively coupled to the first edge node and the second endpoint being communicatively coupled to the second edge node; determine, by the first edge node, that a connection session to a control plane for locating the second endpoint has failed; query one or more available edge nodes for locating the second endpoint using a multicast message; locate the second endpoint based on at least one query response received from the one or more available edge nodes, at least one query response including an identifier of the second endpoint; and establish the connection request between the first endpoint and the second endpoint upon locating the second endpoint.

In one example, a non-transitory computer-readable storage media includes computer-readable instructions which, when executed by one or more processors at a first edge node of a network, cause the one or more processors to receive, at the first edge node, a connection request from a first endpoint to a second endpoint, the first endpoint being communicatively coupled to the first edge node and the second endpoint being communicatively coupled to a second edge node; determine that a connection session to a control plane for locating the second endpoint has failed; query one or more available edge nodes for locating the second endpoint using a multicast message; locate the second endpoint based on at least one query response received from the one or more available edge nodes, at least one query response including an identifier of the second endpoint; and establish the connection request between the first endpoint and the second endpoint upon locating the second endpoint.

Description of Example Embodiments

As noted above, a LISP control plane can include map server nodes that provide a distributed mapping system. The distributed mapping system can map Endpoint Identifiers (EIDs) to routers, switches, fabric edge nodes, etc. When a first client endpoint attempts to communicate with a second client endpoint within a LISP based network, the first client endpoint can send a connection request through a first edge node to the LISP control plane. The LISP control plane can respond to the connection request with location information of the second client endpoint through a second edge node, thus allowing for a connection session to be established between the first client endpoint and the second client endpoint. One problem with such LISP based network is that ensuring continuous communication between network devices hinges on a reliable connection between fabric edge nodes, routers and the map servers of the LISP control plane. If such connection fails at any time, connections between any two hosts may not be established.

The disclosed technology addresses the need in the art for ensuring survivability and continuity of the LISP control plane when a connection failure occurs between an edge node and a map server. More specifically, systems, methods, and computer-readable media are described according to which, when there is a connection failure to the LISP control plane for obtaining location information of a destination endpoint in the network, one or more available edge nodes are queried using a multicast message with which the available edge nodes are configured, for locating the destination client endpoint. The destination client endpoint can be located based on query responses received from the available edge nodes, and a connection can be established with such destination client endpoint upon locating the destination client endpoint.

The disclosure now begins with a description of one or more example settings and systems in which the present technology may be implemented.

Figure 1A:
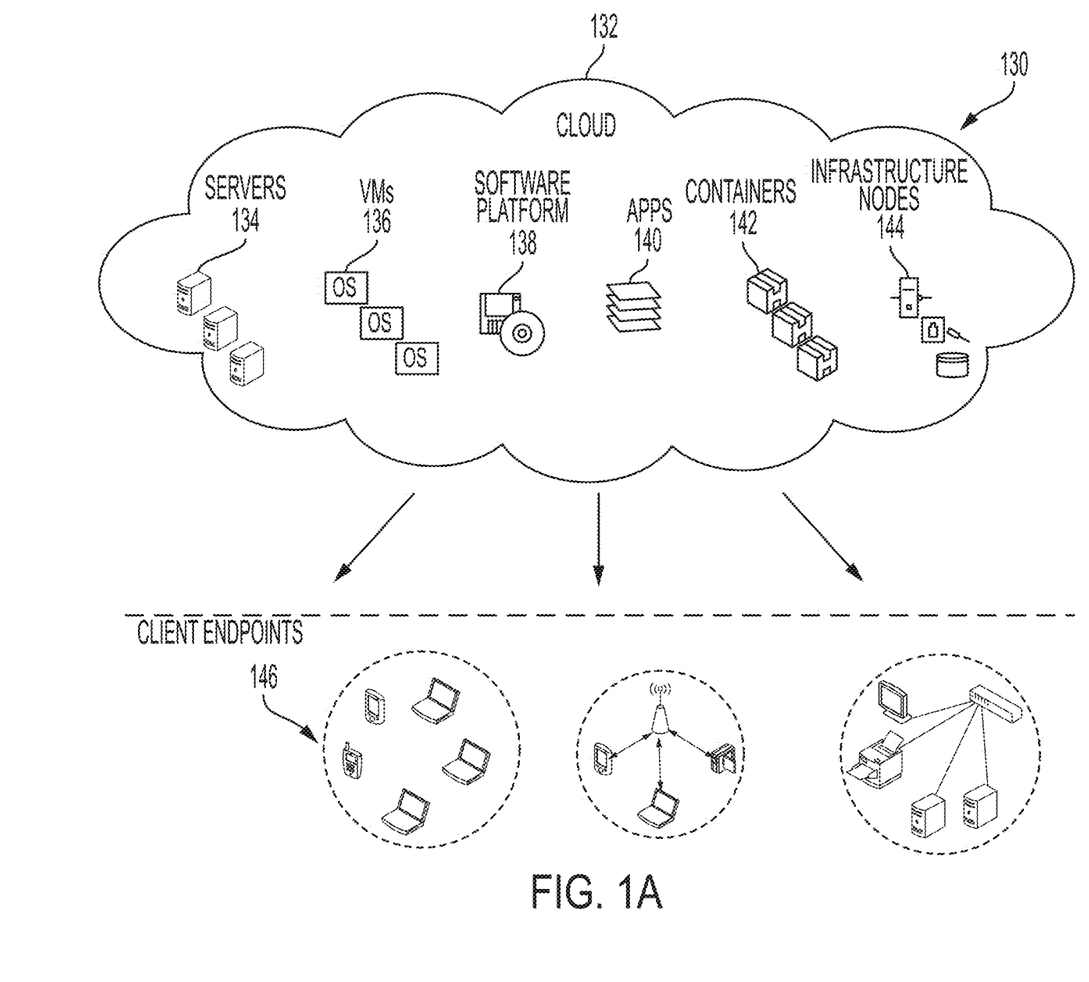
FIG. 1A illustrates an example cloud computing architecture in accordance with some example embodiments.

FIG. 1A illustrates a diagram of an example cloud computing architecture 130. The architecture can include cloud 132. Cloud 132 can include one or more private clouds, public clouds, and/or hybrid clouds. Moreover, cloud 132 can include cloud elements 134, 136, 138, 140, 142, and 144. Cloud elements 134, 136, 138, 140, 142, and 144 can include, for example, servers 134, virtual machines (VMs) 136, one or more software platforms 138, applications or services 140, software containers 142, and infrastructure nodes 144. Infrastructure nodes 144 can include various types of nodes, such as compute nodes, storage nodes, network nodes, management systems, etc.

Cloud 102 can provide various cloud computing services via cloud elements 134, 136, 138, 140, 142, and 144, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

Client endpoints 146 can connect with cloud 132 to obtain one or more specific services from cloud 132. Client endpoints 146 can communicate with elements 134, 136, 138, 140, 142, and 144 via one or more public networks (e.g., Internet), private networks, and/or hybrid networks (e.g., virtual private network). Client endpoints 146 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Client endpoints 146 can communicate with the elements 134, 136, 138, 140, 142, and 144 as part of accessing network services through infrastructure intermediation messaging. Specifically, communications between elements 134, 136, 138, 140, 142, and 144 and client endpoints 146 can be managed and otherwise controlled through a network infrastructure between client endpoints 146 and cloud 132. For example, either or both an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
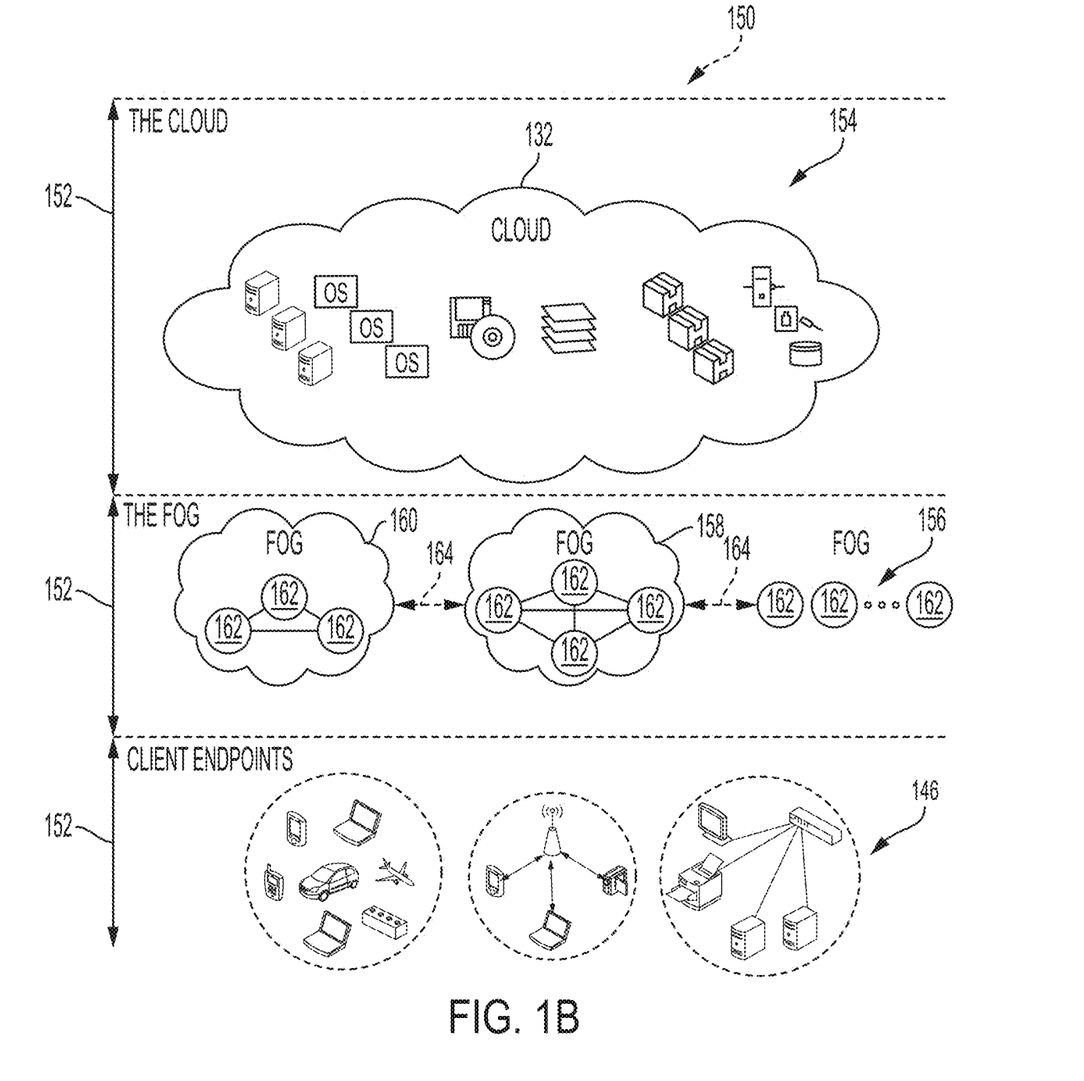
FIG. 1B illustrates an example fog computing architecture in accordance with some example embodiments.

FIG. 1B illustrates a diagram of an example fog computing architecture 150. Fog computing architecture 150 can include cloud layer 154, which includes cloud 102 and any other cloud system or environment, and fog layer 156, which includes fog nodes 162. Client endpoints 146 can communicate with cloud layer 154 and/or fog layer 156. Architecture 150 can include one or more communication links 152 between cloud layer 154, fog layer 156, and client endpoints 146. Communications can flow up the cloud layer 154 and/or down to client endpoints 146.

Fog layer 156 or "the fog" provides the computation, storage and networking capabilities of traditional cloud networks, but closer to the client endpoints. The fog can thus extend cloud 132 to be closer to client endpoints 146. Fog nodes 162 can be the physical implementation of fog networks. Moreover, fog nodes 162 can provide local or regional services and/or connectivity to client endpoints 146. As a result, traffic and/or data can be offloaded from cloud 132 to fog layer 156 (e.g., via fog nodes 162). Fog layer 156 can thus provide faster services and/or connectivity to client endpoints 146, with lower latency, as well as other advantages such as security benefits from keeping the data inside the local or regional network(s).

Fog nodes 162 can include any networked computing devices, such as servers, switches, routers, controllers, cameras, access points, gateways, etc. Moreover, fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158 and 160. Fog instances 158 and 160 can be local or regional clouds or networks. For example, fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with cloud layer 154 and/or client endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with cloud 132 while located at the starting location and switch to a different physical and/or logical connection point with cloud 132 while located at the destination location. The particular fog node can thus move within particular clouds and/or fog instances and, therefore, serve client endpoints from different locations at different times.

Figure 2:
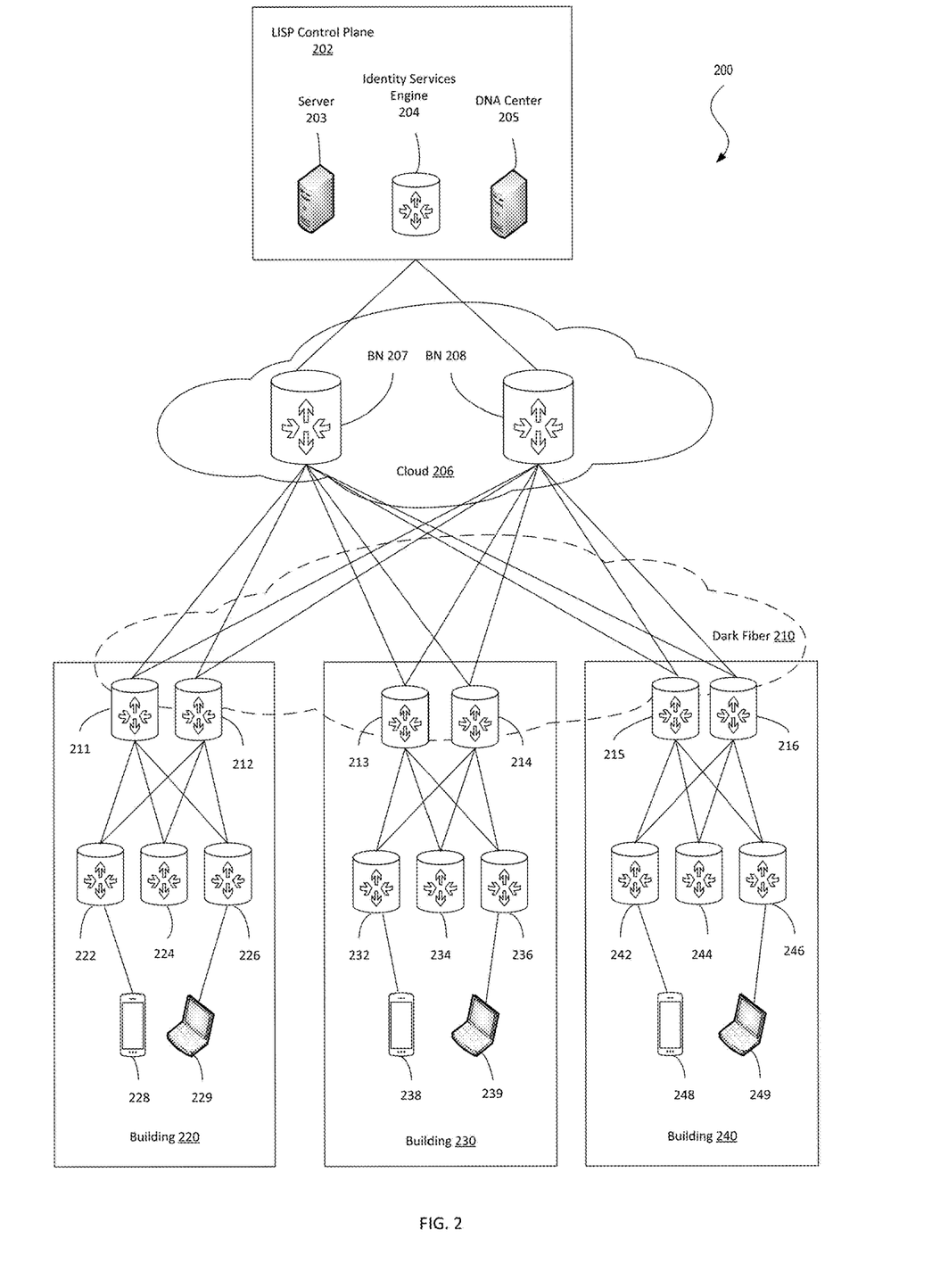
FIG. 2 illustrates an example of a network in accordance with some example embodiments.

FIG. 2 illustrates a network in accordance with some example embodiments. An example network 200 is a Locator Identification Separation Protocol (LISP) based network. However, one of ordinary skill in the art will understand that, for the network 200 and any other system discussed in the present disclosure, there can be additional or fewer components in similar or alternative configurations. The illustrations and examples provided in the present disclosure are for conciseness and clarity. Other example embodiments may include different numbers and/or types of elements but one of ordinary skill the art will appreciate that such variations do not depart from the scope of the present disclosure. Specifically, the network 200 can be implemented, at least in part, through an applicable network environment, such as network architectures 100 and 150 shown in FIGS. 1A and 1B.

As shown in FIG. 2, network 200 includes LISP control plane 202 and cloud 206. Cloud 206 can include default border nodes 207 and 208, each of which can be a switch, a router, etc. Network 200 also includes dark fiber 210 with corresponding border nodes 211 and 212 in building 220, border nodes 213 and 214 in building 230, and border nodes 215 and 216 in building 240. Furthermore, fabric edge nodes 222, 224, and 226 are in building 220, fabric edge nodes 232, 234, and 236 are in building 230, and fabric edge nodes 242, 244, and 246 are in building 240. Network 200 further includes client endpoints (which may also be referred to as endpoints or devices) 228 and 229 in building 220, client endpoints 238 and 239 in building 230, and client endpoints 248 and 249 in building 240. Default border nodes 207 and 208, border nodes 211, 212, 213, 214, 215, and 216, and fabric edge nodes 222, 224, 226, 232, 234, 236, 242, 244, and 246 may be referred to as edge nodes in general. The number of default border nodes, border nodes, fabric edge nodes, and/or client endpoints of network 200 are not limited to those shown in FIG. 2 and may be more or less.

LISP control plane 202 can include map server 203, identity services engine 204, and a Digital Network Architecture (DNA) Controller 205 (controller 205). In one example, map server 203 can store the EID registered for each edge node shown in network 200. In another example, identity service engine 204 can store security information of each edge node shown in network 200, and can authenticate each edge node based on the security policy of network 200. In yet another example, LISP control plane 202 can include firewalls and other applications. Those of ordinary skill in the art will appreciate that LISP control plane 202 can include fewer or more components than illustrated and discussed above with reference to FIG. 2. In some examples, LISP control plane 202 is a centralized LISP control plane facilitating communication between endpoints and edge nodes within enterprise network 200. Specifically, LISP control plane 202 can store location information (e.g., EIDs) of all client endpoints, default border nodes, and fabric edge nodes within the network 200. When a client endpoint (e.g., client endpoint 228) sends a connection request to LISP control plane 202 through an edge node (e.g., fabric edge node 222), LISP control plane 202 will respond to the connection request with location information of the destination client endpoint (e.g., client endpoint 229 connected to fabric edge node 226 or client endpoint 249 connected to fabric edge node 246).

Client endpoints 228, 229, 238, 239, 248, and 249 may be connected to any of the fabric edge nodes within the same building or another one of buildings 220, 230 and/or 240. Fabric edge nodes may also be interconnected with other fabric edge nodes within the same building through corresponding ones of border nodes 211, 212, 213, 214, 215, or 216 within that same building. For example, client endpoint 228 can establish communication with the client endpoint 229 through fabric edge node 222, border node 211, and fabric edge node 226. In another example, client endpoint 228 can establish communication with the client endpoint 229 through fabric edge node 222, border node 212, and fabric edge node 226.

Each of fabric edge nodes 222, 224, 226, 232, 234, 236, 242, 244, and 246 may be connected to one or more of the default border nodes 207 and 208 through corresponding border nodes within the same building, and default border nodes 207 and 208 may be connected to the LISP control plane 202 to send and receive map-request for establishing communication between two client endpoints (e.g., client endpoints 228 and 229, client endpoints 228 and 249, etc.). For example, fabric edge node 222 can establish communication with fabric edge node 226 within the same building 220, by sending such map-request through border node 211 and default border node 207 to LISP control plane 202, and receiving the EID of fabric edge node 226 from LISP control plane 202. Fabric edge nodes may also be interconnected with other fabric edge nodes between two different buildings with the help of default border nodes 207 or 208. Buildings 220, 230 and 240 may be located in geographical proximity of each other (e.g., form a campus such as a university campus) or may be remotely located relative to one another (e.g., in different cities, countries, etc.)

The hierarchy of the default border nodes and the fabric edge nodes does not limit the complexity or scalability of network 200. For example, any of default border nodes 207 and 208, border nodes 211, 212, 213, 214, 215, and 216, and fabric edge nodes 222, 224, 226, 232, 234, 236, 242, 244, and 246 can be one of infrastructure nodes 144 in FIG. 1A and/or fog nodes 162 in FIG. 1B.

As discussed previously, continuous and uninterrupted functioning of enterprise networks (e.g., LISP based networks) can be preserved in case of losing connectivity to a centralized LISP control plane. For example, map servers (e.g., map server 203) of a LISP control plane such as LISP control plane 202 may be located in a different physical location than the buildings in which the network edge nodes of an enterprise are located, any loss of connectivity with the LISP control plane could result in loss of connectivity between edge nodes within the same enterprise network (same building or otherwise). In the non-limiting example of FIG. 2, such loss of connectivity may result when there is a breakdown of connection between default border nodes 207, 208 and LISP control plane 202, a breakdown of connection between any one of border nodes 211, 212, 213, 214, 215, and 216 and default border nodes 207 and 208, etc. Thus, there exists needs for preserving network connectivity among a subset of edge nodes (e.g., within the same building or between different building) and hence endpoints connected to a network, when connectivity to a centralized LISP control plane is lost.

In one example, for maintaining network connectivity in case of losing connection to a LISP control plane, a network controller (e.g., controller 205) of network 200 may provision the fabric of network 200 (e.g., default border nodes, border edge nodes, and fabric edge nodes shown in network 200), to configure a common multicast group address on all edge nodes within network 200. In response, all edge nodes of the network 200 may subscribe to such common multicast group address in the underlay network component of network 200 using Source-Specific Multicast (SSM) or Any-Source Multicast (ASM).

Figure 3:
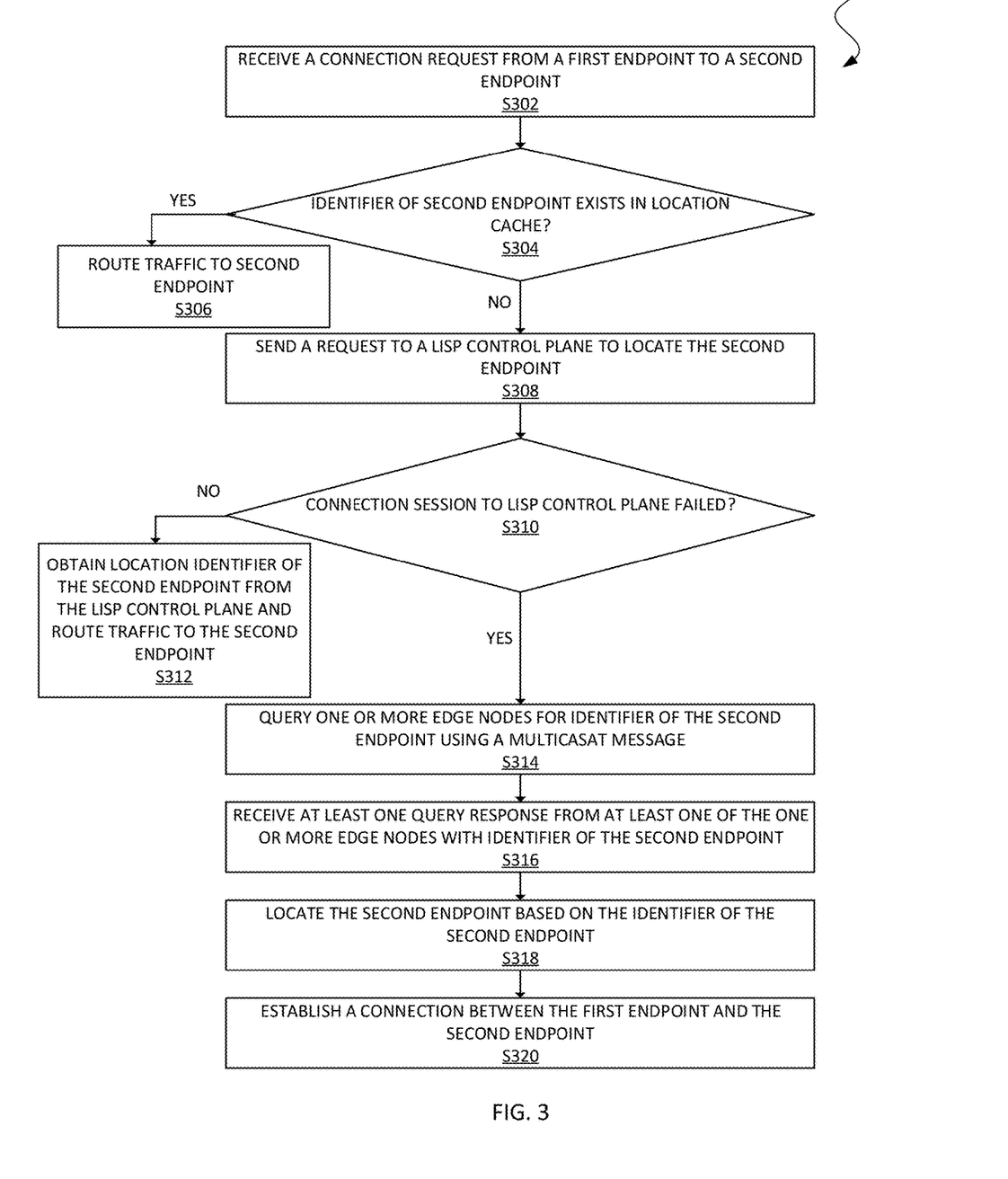
FIG. 3 illustrates an example method for preserving network connectivity to enterprise networks when losing connectivity to a centralized LISP control plane in accordance with some example embodiments.

FIG. 3 illustrates an example method for preserving network connectivity to enterprise networks when losing connectivity to a centralized LISP control plane in accordance with some example embodiments. While an example method is illustrated with a particular order of steps, those of ordinary skill in the art will appreciate that FIG. 3 and the steps described therein can be executed in any order and can include fewer or more steps than illustrated.

Each module shown in FIG. 3 represents one or more steps, processes, methods or routines in the method. For the sake of clarity, the modules in FIG. 3 are described with reference to the network 200 shown in FIG. 2 and can be implemented by any one of edge nodes (default border nodes 207 and/or 208, border nodes 211, 212, 213, 214, 215, and/or 216, or any of the fabric edge nodes 222, 224, 226, 232, 234, 236, 242, 244, and/or 246) of network 200. Edge nodes 222, 211, 207, 212, and 226 will be referenced as non-limiting examples of edge nodes for describing the process of FIG. 3.

At S302, edge node 222 (first edge node) may receive a connection request from client endpoint 228 (a first client endpoint) for communicating (establishing a connection) with client endpoint 229 (a second client endpoint). In examples described throughout the present disclosure, an endpoint may be described as any type of user device (e.g., a mobile device, a laptop, a tablet, an IoT, etc.) connected to a network such as network 200 for establishing a connection with other user devices. However, endpoints are not limited to such examples and can include servers, databases, web-based or cloud-based network components or services that are interactive and accessible to endpoints such as mobile devices, tablets, etc., for information exchange, retrieval, storage, etc.

At S304, after receiving the connection request, edge node 222 may determine whether the identifier of client endpoint 229 exists in a location cache (a database or local storage) of edge node 222 (not shown). In some examples, the identifier of client endpoint 229 may exist in the location cache of edge node 222 if a previous connection has been established between client endpoint 228 and client endpoint 229 through first edge node 222 within a period of time in the past (e.g., past 24 hours, several days, etc.). In some examples, the identifier of client endpoint 229 may exist in the location cache of first edge node 222 if a connection has been established between any client endpoint connected to edge node 222 and client endpoint 229 through edge node 222 within such period of time as described above. An example of the identifier of client endpoint 229 can be the Endpoint Identifier (EID) of client endpoint 229. Such EID of client endpoint 229 can be stored in the location cache of edge node 222 along with the mapping information of the second client endpoint.

If, at S304, edge node 222 determines that the identifier of client endpoint 229 exist in the location cache of edge node 222, than at S306, edge node 222 may route the traffic from client endpoint 228 to client endpoint 229 using the identifier of client endpoint 229.

However, if at S304, edge node 222 determines that the identifier of client endpoint 229 does not exist in the location cache of edge node 222, then at S308, edge node 222 may send a request to LISP control plane 202 to locate client endpoint 229. For example, edge node 222 can send the request to LISP control plane 202 through border node 211 and default border node 207.

At S310, after sending the request, edge node 222 may determine whether the connection session to LISP control plane 202 has failed. In some examples, edge node 222 may determine that the connection session to LISP control plane 202 has failed after edge node 222 detects a loss of connectivity between edge node 222 and LISP control plane 202. Because edge node 222 may send the request to LISP control plane 202 to locate client endpoint 229 through other border nodes at S308, any of these border nodes other than edge node 222 may also determine whether the connection session from edge node 222 to LISP control plane 202 has failed. As shown in FIG. 2, examples of these other border nodes functioning as intermediary nodes for sending the request from edge node 222 to LISP control plane 202 may include border nodes 211 and 212, and default border nodes 207 and 208. One of these intermediary nodes may determine that the connection session from edge node 222 to LISP control plane 202 has failed after an intermediary nodes detects a loss of connectivity to LISP control plane 202. For example, default border node 207 may determine that the connection session from edge node 222 to LISP control plane 202 has failed after default border node 207 detects a loss of connectivity between default border node 207 and LISP control plane 202. In some examples, edge node 222 may determine that the connection session to LISP control plane 202 has failed after the LISP control plane 202 fails to respond to the request within a certain period of time, such as 1 second, 5 seconds, etc.

If, at S310, edge node 222 determines that a connection session to LISP control plane 202 can be established (through any one of edge nodes 211, 212 and any one of default border nodes 207 and 208), then at S312, edge node 222 can obtain the location identifier of client endpoint 229 from LISP control plane 202 and can route the traffic to client endpoint 229.

However, if at S310, edge node 222 determines that a connection session to LISP control plane 202 cannot be established (through any one of edge nodes 211, 212 and any one of default border nodes 207 and 208), then at S314, edge node 222 can query one or more additional edge nodes in network 200 for the identifier of an edge node having at least a record of a previous connection session to client endpoint 229 using a multicast message. Specifically, edge node 222 can send such query to the common multicast group address configured on all edge nodes within network 200 (e.g., by controller 205). As described above, at least one (or multiple or all) edge nodes (e.g., fabric edge nodes 224, 234, and 244, border nodes 212, 214, or 216, or default border node 208 etc.) of network 200 may receive this query because they have subscribed to the common multicast group address, with which controller 205 has configured them. Accordingly, if at S310, edge node 222 determines that a connection session to LISP control plane 202 cannot be established, edge node 222 may use a multicast message to query one or more edge nodes for the identifier of an edge node, such as edge node 226, that is connected to the client endpoint 229.

In certain scenarios, only edge nodes within the same building may receive this query. For example, if client endpoint 228 is trying to connect to client endpoint 229, and there is a loss of connection from edge nodes 211 and 212 to other edge nodes such as default border nodes 207 and 208, then edge node 211 and 212 cannot connect to border nodes 213, 214, 215, and/or 216. Consequently, border nodes 213, 214, 215, and/or 216 as well as edge nodes 232, 234, 236, 242, 244, and/or 246 cannot receive such query from edge node 222 within building 220. Instead, edge node 222 can query fabric edge nodes 224 and 226 for the identifier of client endpoint 229 using the multicast message. In other words, in this particular example, building 220 may be isolated from the rest of the network due to loss of connection between border nodes 211 and 212 and default border nodes 207 and 208. Even in face of such isolation, the present disclosure can ensure connectivity between endpoints 228 and 229 within building 220 using the multicast based query of edge nodes 224 and/or 226 by edge node 222 in order to establish a connection between endpoints 228 and 229.

At S316, after edge node 222 performs the query at S314, edge node 222 may receive at least one query response from at least one of the one or more edge nodes with identifier of client endpoint 229 (e.g., from one of edge nodes 211, 212, 224 and/or 228). In some examples, other available edge nodes outside building 220 but within the network 200 can generate such query response for edge node 222 assuming the identifier of client endpoint 229 is available at their respective local cash. In some examples, each of the other available edge nodes may only maintain connectivity states of endpoints connected thereto and respond with a map-request message to the query. Accordingly, the amount of information on past connections and endpoint identifiers that may be kept at each edge node may be reduced thus increasing efficiency in network resources consumption. In some examples, after edge node 222 performs the query at S314, edge node 222 may receive at least one query response from at least one of the one or more edge nodes with identifier of an edge node, such as edge node 226, that is (or at some point was) connected to the client endpoint 229.

At S318, after receiving the query response at S316, edge node 222 can locate client endpoint 229 based on the identifier of client endpoint 229 included in the query response. In some examples, after receiving the query response at S316, edge node 222 can locate client endpoint 229 based on query response including identifier of an edge node, such as edge node 226, that is connected to the client endpoint 229.

At S320, edge node 222 can establish a connection between client endpoint 228 and client endpoint 229. Such connection can be established between client endpoints 228 and 229, via edge node 222, one of border nodes 211 or 212 and edge node 226 that is connected to client endpoint 229.

In another example and while not shown in FIG. 3, after a loss of connectivity to LISP control plane is detected as described above, edge node 222 may continuously monitor the network to determine if a connection to LISP control plane has been reestablished after the detected loss. Once the connection to LISP control plane has been reestablished, edge 222 may no longer rely on multicast messages to identify identifiers of other endpoints but instead may resort back to requesting such identifiers from map servers (e.g., map server 203) of LISP control plane 202.

While client endpoints 228 and 229 are used as specific examples of endpoints purposes of describing the process of FIG. 3, the present disclosure is not limited thereto. The process of FIG. 3 for utilizing multicast messaging to maintain network connectivity in face of loss of connection to a LISP control plane, is equally application to any two or more endpoints in the same building or in different buildings or geographical locations so long as such endpoints are connected to the same network such as the network of FIG. 2.

As discussed previously, in a LISP based network architecture, when an edge node loses connectivity to the centralized LISP control plane, network connectivity is disrupted and can prevent all or subsets of client endpoints from communicating with each other (within the same physical location or across different physical locations). The disruption caused by this loss of connectivity between one or more edge nodes and the LISP control plane can prove detrimental to the overall network operation and possibly the underlying business operation. For example, an institution or organization that deploys a LISP based network such as those described above with reference to FIGS. 1A-B and 2 (e.g., a medical facilities/institution, a university, a government organization, etc.), can suffer irreparable security, financial and/or sometimes fatal losses caused by such disruption.

The present technology described in this application provides systems, methods, and computer-readable media for preventing any loss of connectivity between edge node(s) and a centralized LISP control plane in a network from disrupting network connection for and between connected endpoints. By implementing a backup multicast messaging scheme, as described above, edge nodes can identify EIDs of other edge nodes and/or endpoints from existing local data bases stored at different edge nodes in the network without having to rely on EID information from a centralized LISP control plane. The identified EIDs are then used to establish network connectivity between any two or more connected endpoints.

With various examples of inventive concepts described above with reference to FIGS. 1A-B, 2 and 3, the disclosure now turns to examples structures of network components that can be utilized as any one of edge nodes, endpoints and/or other system components described above with reference to FIGS. 1A-B, 2 and 3.

Figure 4A:
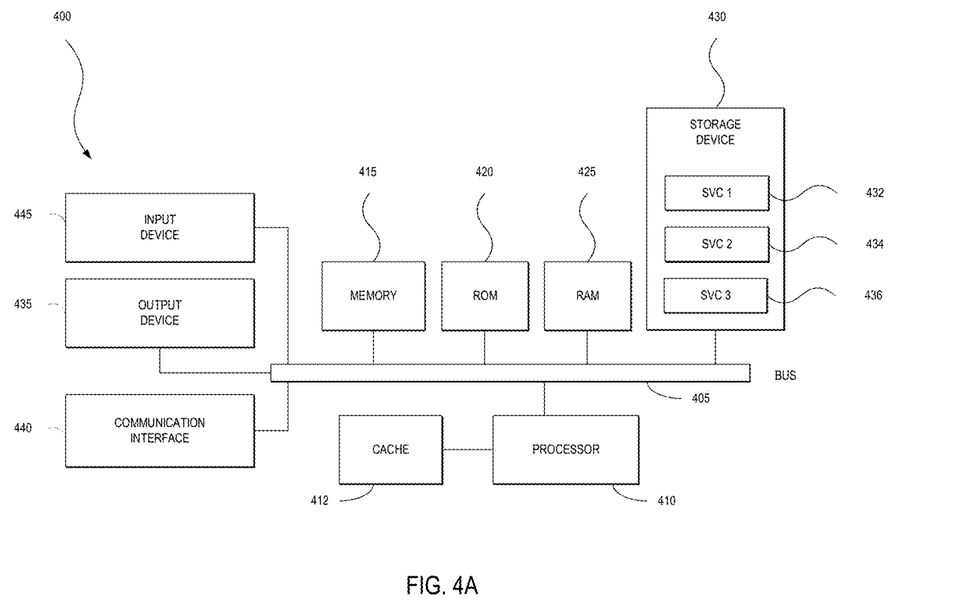
FIGS. 4A and 4B illustrate examples of systems in accordance with some example embodiments.
Figure 4B:
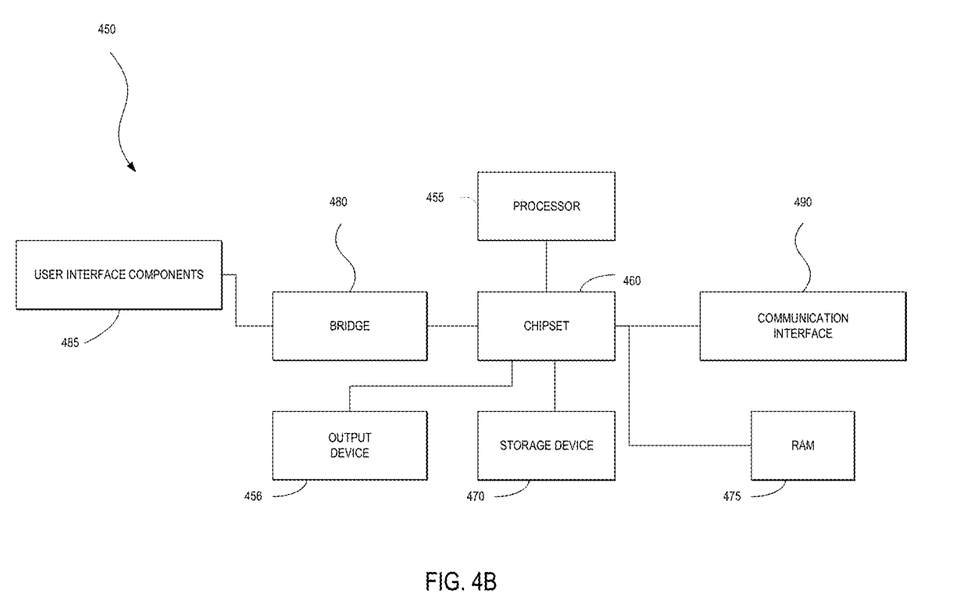

FIG. 4A and FIG. 4B illustrate systems and network architecture, in accordance with some example embodiments. The more appropriate system will be apparent to those of ordinary skill in the art when practicing the various embodiments. Persons of ordinary skill in the art will also readily appreciate that other systems are possible.

FIG. 4A illustrates an example architecture for a bus computing system 400 wherein the components of the system are in electrical communication with each other using a bus 405. The computing system 400 can include a processing unit (CPU or processor) 410 and a system bus 405 that may couple various system components including the system memory 415, such as read only memory (ROM) in a storage device 430 and random access memory (RAM) 425, to the processor 410. The computing system 400 can include a cache 412 of high-speed memory connected directly with, in close proximity to, or integrated as part of the processor 410. The computing system 400 can copy data from the memory 415 and/or the storage device 430 to the cache 412 for quick access by the processor 410. In this way, the cache 412 can provide a performance boost that avoids processor delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing system 400, an input device 445 can represent any number of input mechanisms, such as a microphone for speech, a touch-protected screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing system 400. The communications interface 440 can govern and manage the user input and system output. There may be no restriction on operating on any particular hardware arrangement and therefore the basic features here may easily be substituted for improved hardware or firmware arrangements as they are developed.

Storage device 430 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435, and so forth, to carry out the function.

FIG. 4B illustrates an example architecture for a chipset computing system 450 that can be used in accordance with an embodiment. The computing system 450 can include a processor 455, representative of any number of physically and/or logically distinct resources capable of executing software, firmware, and hardware configured to perform identified computations. The processor 455 can communicate with a chipset 460 that can control input to and output from the processor 455. In this example, the chipset 460 can output information to an output device 465, such as a display, and can read and write information to storage device 470, which can include magnetic media, and solid state media, for example. The chipset 460 can also read data from and write data to RAM 475. A bridge 480 for interfacing with a variety of user interface components 485 can be provided for interfacing with the chipset 460. The user interface components 485 can include a keyboard, a microphone, touch detection and processing circuitry, a pointing device, such as a mouse, and so on. Inputs to the computing system 450 can come from any of a variety of sources, machine generated and/or human generated.

The chipset 460 can also interface with one or more communication interfaces 490 that can have different physical interfaces. The communication interfaces 490 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 455 analyzing data stored in the storage device 470 or the RAM 475. Further, the computing system 400 can receive inputs from a user via the user interface components 485 and execute appropriate functions, such as browsing functions by interpreting these inputs using the processor 455.

It will be appreciated that computing systems 400 and 450 can have more than one processor 410 and 455, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, by a first edge node, a connection request from a first endpoint to a second endpoint, the first endpoint being communicatively coupled to the first edge node and the second endpoint being communicatively coupled to a second edge node;
   determining, in response to the receiving by the first edge node, whether or not a connection session is present between the first edge node and a control plane;
   routing, in response to the determined presence of a connection session between the first edge node and the control plane, traffic from the first endpoint to the second endpoint based on an identifier of the second endpoint as provided by the control plane;
   querying, in response to the determined absence of a connection session between the first edge node and the control plane, one or more available edge nodes for the identifier of the second endpoint using a multicast message;
   locating the second endpoint based on at least one query response received from the one or more available edge nodes in response to the querying, the at least one query response including the identifier of the second endpoint; and
   establishing, in response to locating the second endpoint based on at least one query response received from the one or more available edge nodes, the connection request between the first endpoint and the second endpoint.

2. The method of claim 1, wherein the connection session to the control plane is a Locator Identification Separation Protocol (LISP) session to locate the second endpoint.

3. The method of claim 1, wherein each of the one or more available edge nodes only maintains connectivity states of endpoints connected thereto and responds with a map-request message to the query.

4. The method of claim 1, further comprising:
   determining that the identifier of the second endpoint does not exist in a local cache of the first edge node, wherein the first edge node queries the one or more available edge nodes upon determining that the identifier of the second endpoint does not exist in the local cache of the first edge node.

5. The method of claim 1, wherein the one or more available edge nodes are located within a same physical location as the first edge node.

6. The method of claim 1, wherein the multicast message is sent to a multicast group address with which all edge nodes are configured by a controller of an enterprise network in which the first edge node, the second edge node, the first endpoint and the second endpoint operate.

7. The method of claim 1, wherein the one or more available edge nodes are network fabric edge nodes or default network border nodes.

8. A system comprising:
a first edge node; and
a second edge node, wherein
the first edge node has one or more processors and one or more memories having stored therein computer-readable instructions which, when executed by the one or more processors, cause the one or more processors to perform operations comprising:
receive, at the first edge node, a connection request from a first endpoint to a second endpoint, the first endpoint being communicatively coupled to the first edge node and the second endpoint being communicatively coupled to the second edge node;
determine, in response to the receiving by the first edge node, whether or not a connection session is present between the first edge node and a control plane;
route, in response to the determined presence of a connection session between the first edge node and the control plane, traffic from the first endpoint to the second endpoint based on an identifier of the second endpoint as provided by the control plane;
query, in response to the determined absence of a connection session between the first edge node and the control plane, one or more available edge nodes for the identifier of the second endpoint using a multicast message;
locate the second endpoint based on at least one query response received from the one or more available edge nodes in response to the querying, the at least one query response including the identifier of the second endpoint; and
establish, in response to locating the second endpoint based on at least one query response received from the one or more available edge nodes, the connection request between the first endpoint and the second endpoint.

9. The system of claim 8, wherein the connection session to the control plane is a Locator Identification Separation Protocol (LISP) session to locate the second endpoint.

10. The system of claim 8, wherein each of the one or more available edge nodes only maintains connectivity states of endpoints connected thereto and responds with a map-request message to the query.

11. The system of claim 8, to the operations further comprising:
determine that the identifier of the second endpoint does not exist in a local cache of the first edge node, wherein the first edge node queries the one or more available edge nodes upon determining that the identifier of the second endpoint does not exist in the local cache of the first edge node.

12. The system of claim 8, wherein the one or more available edge nodes are located within a same physical location as the first edge node.

13. The system of claim 8, wherein the multicast message is sent to a multicast group address with which all edge nodes are configured by a controller of an enterprise network in which the first edge node, the second edge node, the first endpoint and the second endpoint operate.

14. The system of claim 8, wherein the one or more available edge nodes are network fabric edge nodes or default network border nodes.

15. One or more non-transitory computer-readable media comprising computer-readable instructions which, when executed by one or more processors at a first edge node of a network, cause the one or more processors to perform operations comprising:
receive, at the first edge node, a connection request from a first endpoint to a second endpoint, the first endpoint being communicatively coupled to the first edge node and the second endpoint being communicatively coupled to a second edge node;
determine, in response to the receiving by the first edge node, whether or not a connection session is present between the first edge node and a control plane;
route, in response to the determined presence of a connection session between the first edge node and the control plane, traffic from the first endpoint to the second endpoint based on an identifier of the second endpoint as provided by the control plane;
query, in response to the determined absence of a connection session between the first edge node and the control plane, one or more available edge nodes for the identifier of the second endpoint using a multicast message;
locate the second endpoint based on at least one query response received from the one or more available edge nodes in response to the querying, the at least one query response including the identifier of the second endpoint; and
establish, in response to locating the second endpoint based on at least one query response received from the one or more available edge nodes, the connection request between the first endpoint and the second endpoint upon locating the second endpoint.

16. The one or more non-transitory computer-readable media of claim 15, wherein the connection session to the control plane is a Locator Identification Separation Protocol (LISP) session to locate the second endpoint.

17. The one or more non-transitory computer-readable media of claim 15, wherein each of the one or more available edge nodes only maintains connectivity states of endpoints connected thereto and responds with a map-request message to the query.

18. The one or more non-transitory computer-readable media of claim 15, to the operations further comprising:
determine that the identifier of the second endpoint does not exist in a local cache of the first edge node, wherein the first edge node queries the one or more available edge nodes upon determining that the identifier of the second endpoint does not exist in the local cache of the first edge node.

19. The one or more non-transitory computer-readable media of claim 15, wherein the one or more available edge nodes are located within a same physical location as the first edge node.

20. The one or more non-transitory computer-readable media of claim 15, wherein the multicast message is sent to a multicast group address with which all edge nodes are configured by a controller of the network in which the first edge node, the second edge node, the first endpoint and the second endpoint operate.

* * * * *